United States Patent [19]

Degrauwe

[11] Patent Number: 5,623,432
[45] Date of Patent: Apr. 22, 1997

[54] MICROSYSTEM WITH LOW ENERGY CONSUMPTION

[75] Inventor: Marc Degrauwe, Chez-le-Bart, Switzerland

[73] Assignee: CSEM Centre Suisse d'Electronique et de Microtechnique, Switzerland

[21] Appl. No.: 438,790

[22] Filed: May 11, 1995

[30] Foreign Application Priority Data

May 11, 1994 [CH] Switzerland .......................... 01473/94

[51] Int. Cl.$^6$ .................................................. G06F 1/00
[52] U.S. Cl. ........................................... 364/707; 395/750
[58] Field of Search ............................. 364/707; 395/750

[56] References Cited

U.S. PATENT DOCUMENTS

| | | | |
|---|---|---|---|
| 5,000,275 | 3/1991 | Bullivant | 177/210 |
| 5,280,162 | 1/1994 | Marwin | 235/462 |
| 5,508,836 | 4/1996 | DeCaro et al. | 395/189 |

*Primary Examiner*—Chuong D. Ngo
*Attorney, Agent, or Firm*—Pollock, Vande Sande & Priddy R.L.L.P.

[57] ABSTRACT

This microsystem enables a phenomenon, whose evolution over time is random, to be analyzed. It comprises means for reducing its consumption of energy which acts via a modification of the operating features of the microsystem, the effect of this modification being the passage of said microsystem from an active state to at least one other state, for example a stand-by state. A phenomenon detecting device (30 to 50) generates a representative signal ($V_{out}$) which represents the evolution of the phenomenon over time. The representative signal is provided for utilization at an output terminal (37). The microsystem also comprises a threshold circuit (36) connected to the detecting device (30 to 35) and the output terminal (37) for subjecting the representative signal ($V_{out}$) to a comparison with a predetermined threshold and for generating a corresponding comparison signal ("mod"). A feedback circuit (38) acts, in response to the comparison signal, upon the detecting device (30 to 35) to modify its detecting performance, this feedback circuit being capable of modifying at least one operating parameter ($f_{Hi}$; $I_{Pi}$; $V_{Oi}$; $V_{fbi}$) of the microsystem, the effect of this modification being a change in its energy consumption.

1 Claim, 4 Drawing Sheets

MICROSYSTEM WITH LOW ENERGY CONSUMPTION

FIELD OF THE INVENTION

The present invention relates to microsystems, such as measuring systems intended to process or to take account of an input signal of which the mere presence, or possibly a state or a predetermined value is not permanent, but may alternate in accordance with a more or less random time cycle. A microsystem of this type may for example be a measuring system for measuring a parameter which may appear at any moment and whose value must be able to be immediately evaluated by the microsystem as soon as it presents itself.

BACKGROUND OF THE INVENTION

It is known that microsystems are often used in conditions in which the energy they need in order to operate is not available in a large quantities. This is the case notably for systems supplied by a cell or a battery. Further, for various reasons, such as ecological or economic reasons, one seeks to limit the use of such sources of energy as much as possible, which means that one seeks to extend the life span of the source of energy as much as possible, and thus to use such energy sources in conditions of optimum consumption.

Conventionally, microsystems may use a stand-by circuit which is capable of waking the system and causing it to pass from a low power mode in which only the components which must necessarily receive energy (the memories for example) have voltage applied to them, to a full power mode which enables the system in its entirety to be operated. The passage from stand-by mode to the normal operating mode is thus triggered as soon as an action is carried out on the system. A typical example of this type of operation is the personal micro-computer whose screen and other functions can be put on stand-by or be awoken, this latter operation intervening as soon as the operator touches a key of the computer keyboard.

Another more general example is that of microprocessors in all types of microsystems in which the program sequence is only triggered by an external action which causes it to pass from the execution of a stand-by program loop to the execution of the actual program itself. This example is often designated by the term "watchdog".

However, in certain cases, and notably in measuring systems, conventional stand-by/waking circuits are not appropriate. Further, certain phenomena to be measured, for example, have completely random recurrences with equally unpredictable periods of absence and presence, even though the system has to begin functioning as soon as the phenomenon reappears.

Decreasing the consumption of certain measuring systems by deliberately reducing their sensitivity vis-à-vis the phenomenon to be measured is also known. However, in this case too, the solution may not be satisfactory, for in certain cases, the sensitivity must be increased in the absence of the phenomenon, or at least maintained at its nominal value, precisely in order not to miss the moment when it reappears.

SUMMARY OF THE INVENTION

The invention proposes to provide a microsystem enabling the aforementioned problems associated with stand-by/waking circuits of the prior art to be avoided.

The invention thus concerns a microsystem intended to analyse or to use an input signal representing a phenomenon whose evolution over time is random, said microsystem being provided with means for reducing its energy consumption, these means acting via a modification of the microsystem's operating features, the result of this modification being the passage of the microsystem from a so-called active state to at least one other state one of which is a so-called stand-by state, this microsystem comprising means for detecting said phenomenon in order to generate a representative signal which represents its evolution over time and utilising means for exploiting said representative signal, this microsystem being characterised in that it also comprises a threshold circuit connected to said detecting means and said utilising means for subjecting said representative signal to a comparison with a predetermined threshold and to generate a corresponding comparison signal, feedback means, which, in response to said comparison signal, act on said detecting means to modify their detection performance and means which, also under the control of said feedback circuit, are capable of modifying at least one operating parameter of said microsystem, the result of this modification being a change in the consumption of said microsystem.

It follows from these features that the change in the operating state of the microsystem is caused not by a deliberate action or because of a time dependent cyclical verification, but by a change in the evolution of the phenomenon itself which the microsystem is intended to process. The result of this is that, despite the random nature of the evolution of the phenomenon, one can follow the latter very closely and intervene in the change in operating state of the system as soon as this evolution satisfies a predetermined criterion.

BRIEF DESCRIPTION OF THE DRAWINGS

Other features of the invention will appear during the course of the following description, given solely by way of example and made with reference to the attached drawings in which.

DETAILED DESCRIPTION OF THE INVENTION

Figure 1:
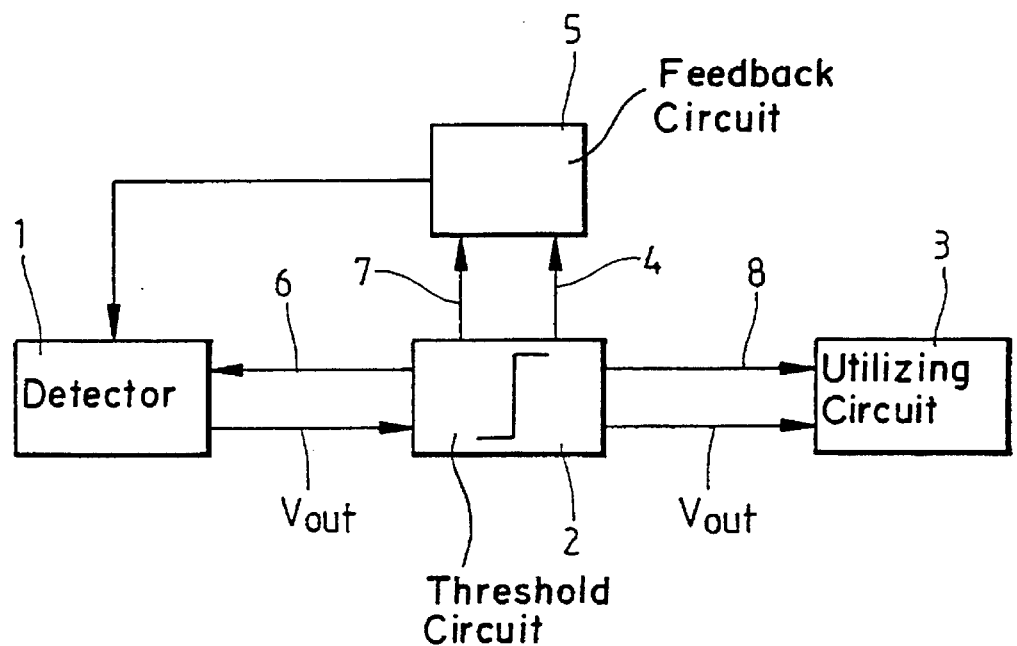
FIG. 1 is a very simplified schematic diagram showing the principles of the invention.

Reference will be made first of all to FIG. 1 in order to explain the general principles of the invention. As already indicated above, the latter proposes to reduce the energy consumption of electronic microsystems in general, by monitoring the behavior over time of a parameter or of a phenomenon which constitutes the input signal and only to actuate the electronic microsystem if the phenomenon responds to certain predefined conditions, such as for example its mere presence or absence in the form of any value other than zero.

Consequently, according to the general concept of the invention, the "phenomenon" may take the form of any electronic signal whose state or value is a manifestation of the necessity for the electronic microsystem to enter into a higher performing phase of activity, requiring a more significant consumption of energy by the microsystem or conversely, into a minimum performing phase of activity during which the consumption of the microsystem can thus be reduced to the minimum. It is to be noted that the invention also envisages the case in which the performance of the microsystem can be adjusted to different values ranging between maximum performance and minimum performance. If the microsystem is a measuring system, the performance may for example be the resolution with which the phenomenon is measured.

As will be seen below, these general principles of the invention are particularly well suited to application in measuring microsystems where the "phenomenon" is formed by the value to be measured which appears at the input of the microsystem, sometimes in the form of a reduced value, sometimes in the form of a value within the normal range of this value which the microsystem has to cover. However, it is clear that the invention is not limited to such a specific application.

This being so, FIG. 1 shows a microsystem according to the invention with first of all a phenomenon detector 1 which must be designed in such a way that it can provide at any time an electric signal accounting for the evolution of the phenomenon over time. Detector 1 is connected to a threshold circuit 2 intended to examine whether, during the evolution of the phenomenon over time, a certain criterion is satisfied, this criterion being generally the magnitude of the phenomenon. The signal issued by threshold circuit 2 is transmitted to a utilising circuit 3, this term indicating any circuit enabling the behavior of the phenomenon over time to be exploited for any predetermined purpose.

Threshold circuit 2 is also connected, by a connection 4, to a feedback circuit 5 which, via its output, is connected to phenomenon detector 1. This feedback circuit 5 is capable of modifying the behavior, for example the sensitivity, of detector 1 to enable it to be adapted to the evolution of the phenomenon. For example, when the phenomenon is low, the sensitivity of the detector may be high, while in the opposite case this sensitivity is reduced.

Threshold circuit 2 is also connected, by respective connections 6, 7 and 8 to all the other microsystem circuits to act in an appropriate manner on the consumption of the latter. It will be seen below that this action of threshold circuit 2 on consumption may be achieved in different ways by acting on different operating parameters such as the sampling frequency, the supply current and/or voltage, the polarisation of the circuits etc., these consumption reducing means being able to be used independently of each other or, conversely, cumulatively. In the latter case, the consumption reducing effects may be combined.

Assemblies 1 and 5 of the circuit of FIG. 1 respectively designated by the expressions "phenomenon detector" and "feedback circuit" may be achieved in different ways, provided that they fulfil the general functions necessary for the invention. For example, phenomenon detector 1 may comprise a single sensor ("sensor" is used here to mean any mechanical, electrical, electromechanical or other component capable of supplying a signal representative of the phenomenon) connected to two interfaces, one for the "active" mode and the other for the "stand-by" mode, feedback circuit 5 having then the role of a switch from one interface to the other or conversely as a function of the crossing of the threshold of circuit 2 in one direction or another by the signal which is applied to it.

In another configuration, there is only one interface whose operating features may be modified under the influence of the feedback circuit in cooperation with threshold circuit 2.

Figure 2:
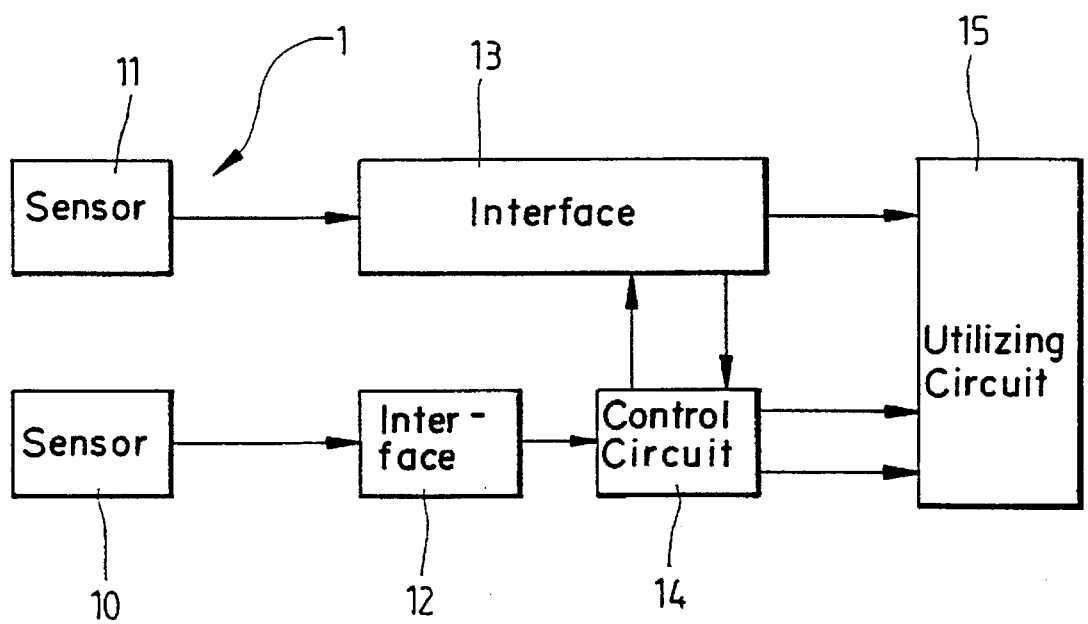
FIG. 2 shows a schematic diagram of a circuit enabling a first embodiment of the principles of the invention to be achieved, within the framework of a measuring system.

In a third configuration shown in FIG. 2, the phenomenon detector can comprise two phenomenon sensors 10 and 11, with different sensitivities, high sensitivity sensor 10 being used in the stand-by mode and low sensitivity sensor 11 in the active mode. This configuration has the advantage of enabling the actual detection of the phenomenon with a maximum sensitivity, sensor 10 being saturated when the phenomenon appears with it or its working values.

The microsystem of FIG. 2 also comprises interfaces 12 and 13 and a management or control circuit 14 which combines the functions of threshold detecting and feedback circuit and which enables sensor 11 and its associated interface 13 to be made active as soon as the threshold is crossed by the phenomenon representative signal. Interface 13 is connected to a utilising circuit 15 so that the useful signal can be processed and exploited as required. Of course control circuit 14 is also connected to the different components of the microsystem to enable it to put it into low consumption mode when it is in "stand-by" mode. In order to return the microsystem to its stand-by mode, it is sufficient to give interface 13 a monitoring function enabling it to send a signal to control circuit 14 when for a predetermined period of time, the phenomenon has not manifested itself or crossed the predefined threshold again.

In the microsystem of FIG. 2, high sensitivity sensor 10 may be considerably simpler than sensor 11 which must account for the phenomenon with great precision. The energy consumption of interface 12 which is connected to it may thus be greatly reduced.

Figure 3:
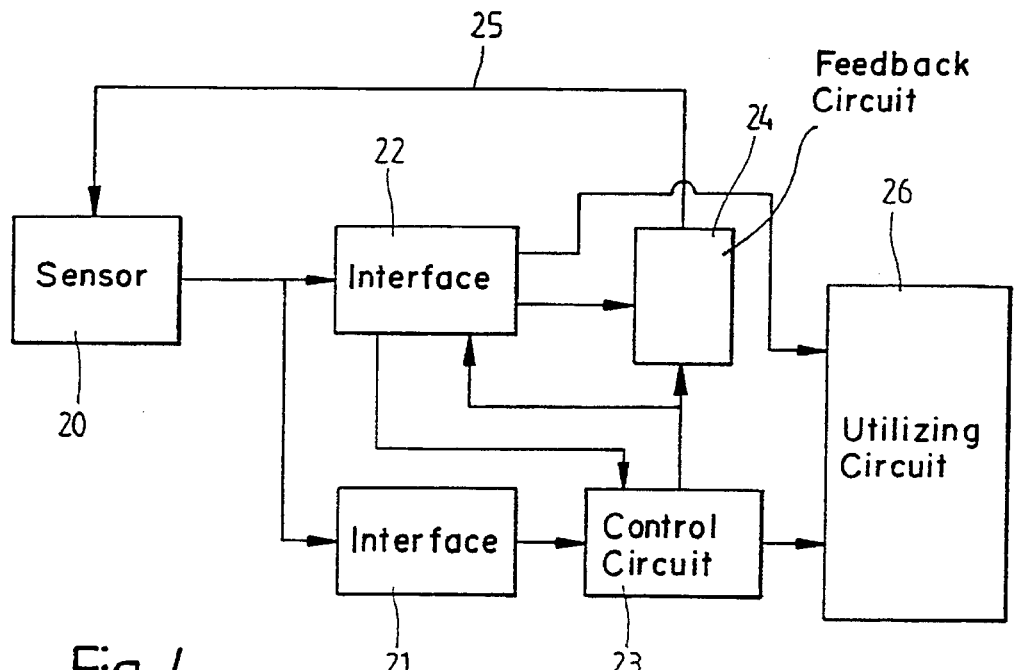
FIG. 3 shows a schematic diagram of a circuit enabling a second embodiment of the principles of the invention to be achieved, also within the framework of a measuring system.

According to FIG. 3, the invention is implemented by using a single sensor 20 whose sensitivity must be able to be regulated according to whether the microsystem is in an active state or in a stand-by state.

Sensor 20 is therefore connected to two interfaces 21 and 22, one of which 21 is assigned to the stand-by mode and the other 22 to the active mode. The two interfaces 21 and 22 are connected to a management or control circuit 23.

A feedback circuit 24 is connected to an output of interface 22 and via a feedback connection 25 to sensor 20. Feedback circuit 24 has the function of modifying the sensitivity feature of sensor 20, this modification being brought about in accordance with the construction of sensor 20 itself. The useful signal is elaborated in a utilising circuit 26 which is connected to interface 22 and to control circuit 23.

As long as no phenomenon is detected or the signal which represents it does not cross a predetermined threshold, sensor 20 is used in its most sensitive mode. In the opposite case, control circuit 23 actuates feedback circuit 24 which assures the feedback function vis-à-vis sensor 20 to reduce its sensitivity and to enable it to bring about the "full-scale" detection of the phenomenon.

In the following description, the invention will be illustrated with the aid of a practical example concerning an accelerometer in which the phenomenon in question above is thus the acceleration (of a moving structure equipped with the microsystem, for example) and in which one is concerned with measuring the evolution of this acceleration over time, the acceleration being able to be present or absent according to a totally random time cycle. In this example, the sensor component is considered to be a force sensor of the capacitive type. It is, however, emphasised that this is only an illustrative example of the invention to which the latter is in no way limited. With regard to the design peculiarities of the accelerometer which are not relevant to the present invention, reference can be made to the European patent application No. 0 590 658 in the name of the applicant of the present patent application.

Figure 4:
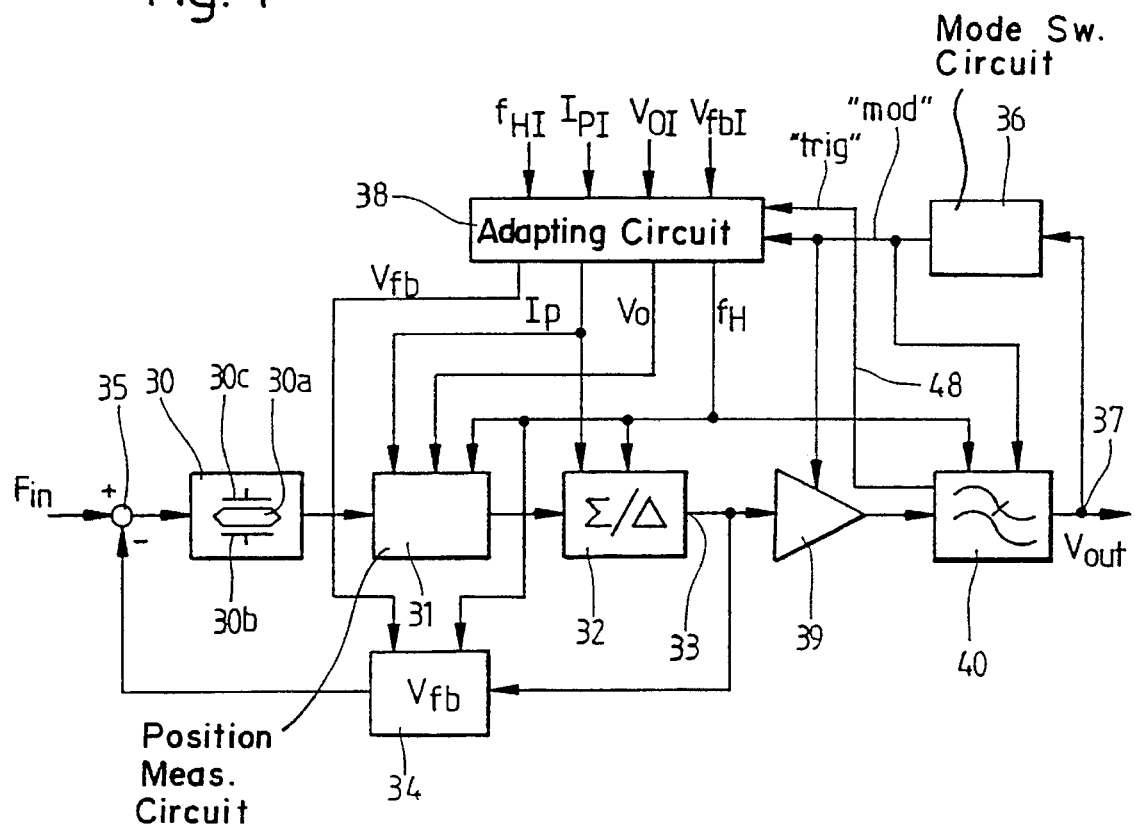
FIG. 4 is a simplified schematic diagram of a circuit according to the invention in its application to a measuring microsystem enabling a mechanical acceleration to be measured.

FIG. 4 is a schematical representation of an accelerometer microsystem of this type to which the invention is applied and which comprises a differential capacitive sensor 30 comprising a mobile mass 30a which can be moved between two capacitor plates 30b and 30c. The capacitors thus formed are connected to a so-called position measuring circuit 31 which supplies at its output an analogue signal for measuring the deviation of mass 30a, it being clear that this measurement is preferably realised by using a switched-capacitor circuit, the measurement thus being made by sampling at the frequency of the microsystem clock signal. The output signal of position measuring circuit 31 is applied to a sigma-delta modulator 32 which supplies the measuring signal representing the acceleration in the form of a train of pulses of variable density.

The output signal appearing at the output terminal 33 of sigma-delta modulator 32 is brought back to sensor 30 in the form of a voltage $V_{fb}$ which tends to maintain mass 30a always in an equidistant position in relation to the two plates 30b and 30c. This voltage $V_{fb}$ may be adjusted to the suitable value, for example via an amplification, in an adapting circuit 34 whose output is applied to sensor 30 to maintain mass 30a in its neutral position. This function is represented in FIG. 4 by the adder element 35 which is also intended to receive a value $F_{in}$ of the force to be measured.

The elements which are necessary to apply the concept of the invention to this accelerometer, comprise a mode switching circuit 36 reacting as a function of the evolution of the system output signal $V_{out}$, said signal appearing at the output terminal 37. The output of circuit 36 is connected on the one hand to a circuit 38 for adapting various operating parameters of the microsystem, and on the other hand to an amplimfier 39 mounted at the output of sigma-delta modulator 32, this amplifier being further connected to a decimation filter 40 intended to adapt the sampling frequency of the signal which is applied to it by amplifier 39, to the utilising conditions of the measuring signal in the circuits (not shown) which are connected in series to the microsystem and which exploit the measured acceleration signal.

Adapting circuit 38 may be designed to adapt at least one of the microsystem operating parameters, that is to say at least that which is critical for the reduction of its consumption when it operates in stand-by mode. This parameter is, preferably the sampling frequency used by the microsystem; however, the example examined here enables four operating parameters to be adapted at the same time in order to achieve a maximum reduction in the consumption of the circuit.

Figure 5:
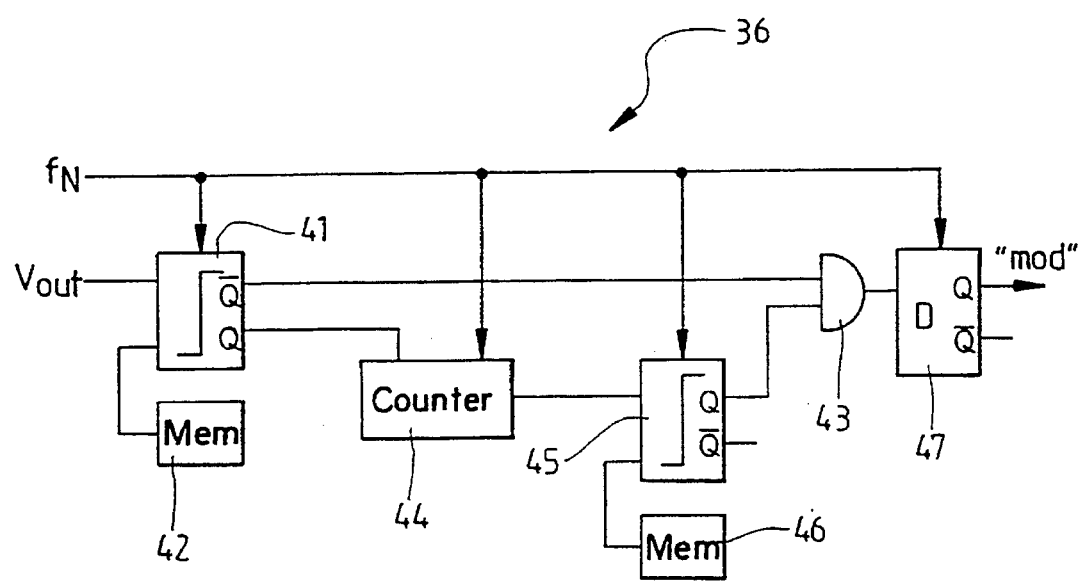
FIG. 5 shows a more detailed circuit using the application shown in FIG. 4.

FIG. 5 shows an example of an embodiment of mode switching circuit 36 to which microsystem output signal $V_{out}$ is applied as input signal. This signal is received by a numerical comparator 41 which compares it to a reference stored in a memory 42. Comparator 41 supplies, upon clock signal $f_N$, a "1" at its output Q and a "0" at its output $\overline{Q}$. Output $\overline{Q}$ is connected to an "AND" logical gate 43, while output Q is connected to a counter 44 which counts at the pace of frequency $f_N$. The output of this counter 44 is connected to a second numerical comparator 45 which compares the output of the counter to a reference value stored in a memory 46. This reference value is selected as a function of the evolution speed of the signal to be measured. Output $\overline{Q}$ of comparator 45 is connected to the second input of "AND" gate 43. The output of this "AND" gate is connected to a latch "D" 47 at output $\overline{Q}$ from which mode control signal "mod" appears. In the example described, a "0" at the output of latch 47 controls the microsystem active mode and a "1" the stand-by mode.

When the microsystem is in stand-by mode and signal $V_{out}$ exceeds the threshold fixed in memory 42, the output signal of switching circuit 36 immediately passes to "0" in order to generate the command "active mode" which places the microsystem in its measuring configuration.

In the opposite case, when the circuit operates in the active mode, signal "mod" only passes to the value "1" when signal $V_{out}$ has remained above the threshold value during a period of time which is fixed by the reference value of memory 46.

Amplifier 39 and decimation filter 40 are of conventional design, with the exception that the decimation factor of filter 40 may be adapted to the clock frequency. Further, the filter produces an authorisation signal "trig" on a connection 48 (FIG. 4), each time that a new value appears at its output 37. This signal "trig" validates the triggering of the economising measures taken by adapting circuit 38 upon the action of control circuit 36.

Figure 6:
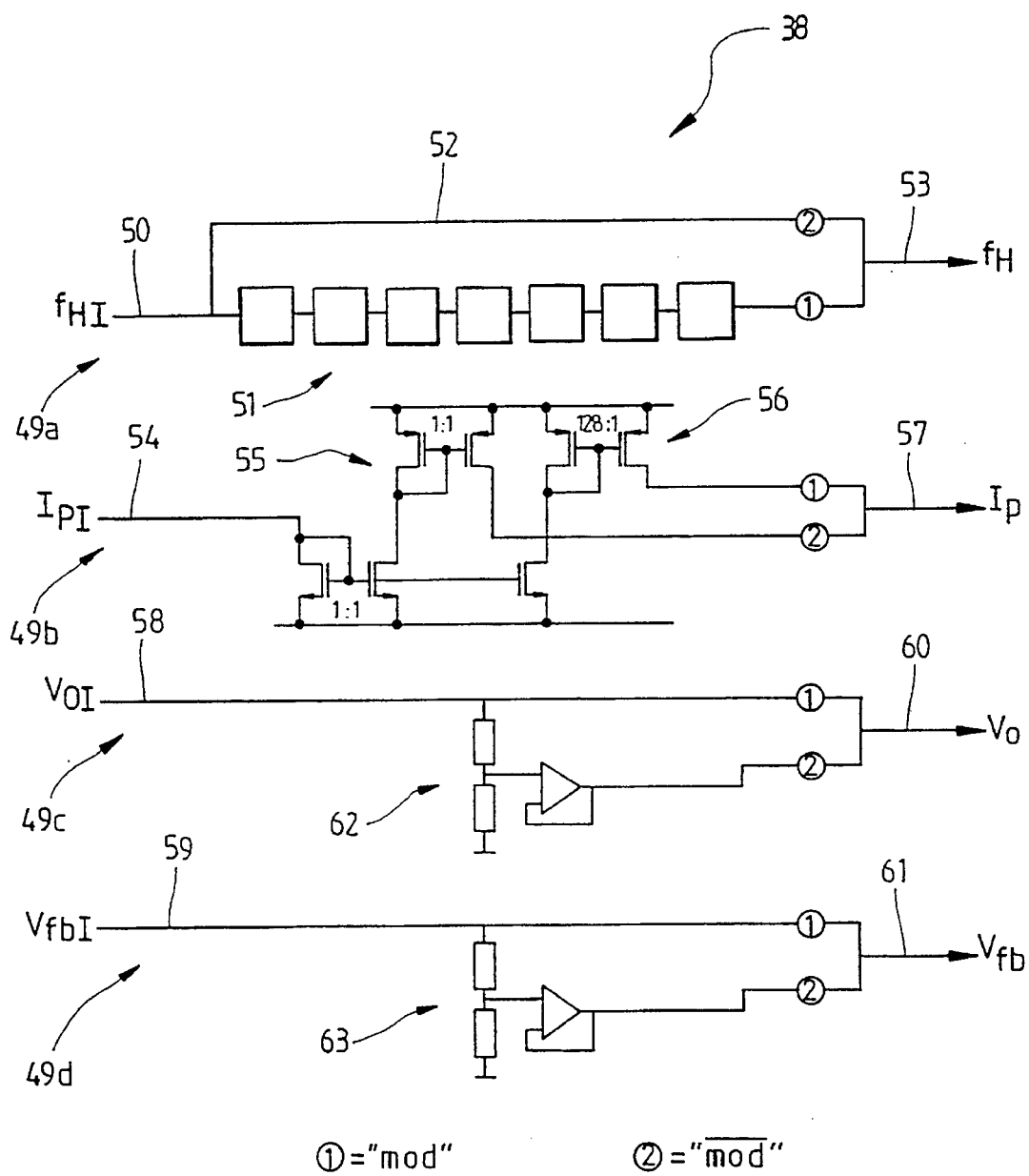
FIG. 6 shows a more detailed schematic diagram of a part of the circuit shown in FIG. 4.

FIG. 6 shows the construction of adapting circuit 38. In the embodiment described, this circuit comprises four paths 49a to 49d intended respectively to bring about the adaptation of as many operating parameters of the microsystem. Thus adapting paths 49a to 49d process in order: a clock frequency $f_{HI}$, a polarisation current $I_{PI}$ of all or part of the microsystem transistors, a polarisation voltage $V_{OI}$ of the paths of sensor 30 and a compensation voltage $V_{fbI}$ applied to at least one of the plates of the sensor to maintain mass 30a in its intermediate position.

Path 49a to input 50 of which microsystem clock frequency $f_{HI}$ is thus applied, comprises a frequency divider 51 and a short-circuit connection 52 intended to short-circuit divider 51. This short-circuit connection 52 together with the output of the filter, passes via two transistorised switches (represented by circles numbered 1 and 2) which are controlled by signal "mod", this latter having undergone an "AND" operation with signal "trig" of filter 40.

It is thus understood that when switch 1 is closed, path 49a provides at its output 53 a sampling frequency $F_H$ reduced by a factor of 128 for example (stand-by mode), whereas when switch 2 is closed, this output 53 provides clock frequency $F_{HI}$ without having undergone any adaptation (active mode).

An identical operation is imposed on paths 49b, 49c and 49d. Path 49b receives at its input 54 a polarisation current $I_{PI}$ which passes selectively according to the state of signal "mod" via a current mirror 55 of ratio 1:1 or via a current mirror 56 of ratio 1:128 for example, current mirrors 55 and 56 being connected respectively by switches 1 and 2 to provide to this path 49b either current IPI or current Ip at output 57.

Paths 49c and 49d are identical in design and transmit directly respectively voltage $V_{OI}$ or $V_{fbI}$ from output 58 or 59 to output 60 or 61 or indirectly via the intermediary of a voltage divider 62 or 63 as a function of the positions of switches 1 and 2 of these paths.

In accordance with the preceding description, the invention thus enables the microsystem, as a function of the value of the power applied to sensor 30, to be placed in a stand-by state in which it consumes little energy or in an active state in which it consumes the nominal quantity of energy. In fact, one can consider that the invention thus enables the resolution of the measuring system to be regulated. One can, within the framework of the present invention, enable this resolution to be regulated to intermediate values, in consideration of which it is sufficient that the adapting circuit can supply to the output of each of paths 49*a* to 49*d*, not only two values of the operating parameters as described above, but also intermediate values of the parameters.

What is claimed is:

1. A microsystem for analyzing or using an input signal representing a phenomenon whose evolution over time is random, said microsystem being provided with means for reducing its consumption of energy, said reducing means acting via a modification of the microsystem operating features, the result of said modification being a passage of said microsystem from an active state to at least one other state which is a stand-by state, said microsystem comprising detecting means for detecting said phenomenon and generating a representative signal which represents the evolution of said phenomenon over time, utilizing means for exploiting said representative signal, a threshold circuit connected to said detecting means and to said utilizing means for subjecting said representative signal to a comparison with a predetermined threshold and for generating a corresponding comparison signal, and feedback means which, in response to said comparison signal, acts upon said detecting means to modify its detection performance, said feedback means being capable of modifying at least one operating parameter of said microsystem, the result of this modification being a change in the energy consumption of said microsystem.

\* \* \* \* \*